E. A. BARBET.
PROCESS FOR REMOVING THE TAR FROM PYROLIGNEOUS LIQUIDS.
APPLICATION FILED OCT. 14, 1918.
1,371,460.
Patented Mar. 15, 1921.
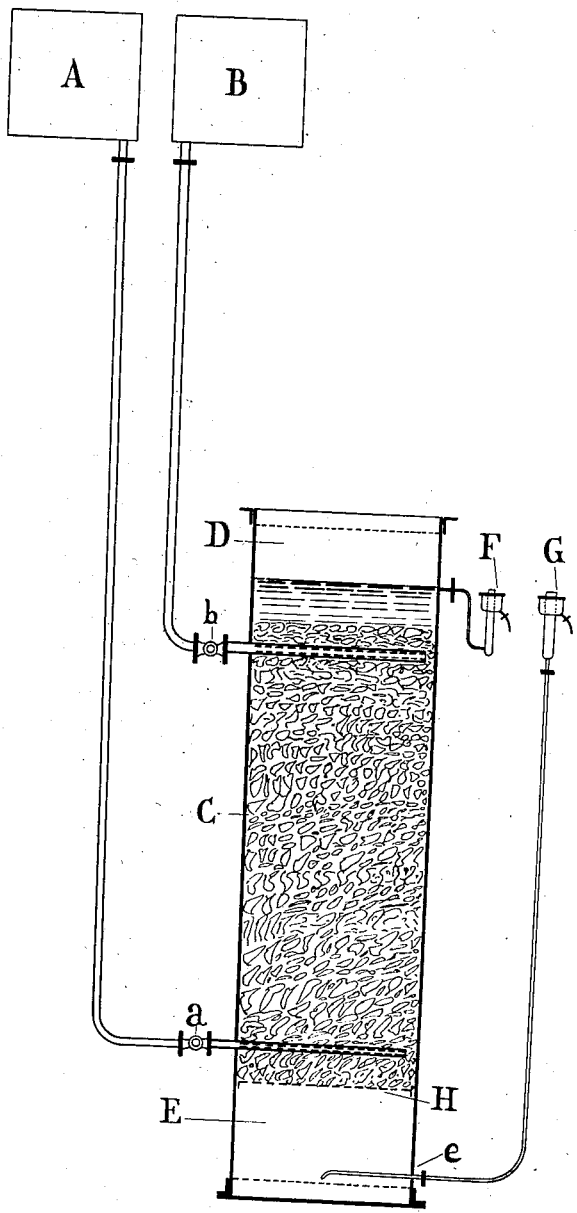
Inventor.
E. A. Barbet.
By H. R. Kerslake
Atty

UNITED STATES PATENT OFFICE.

EMILE AUGUSTIN BARBET, OF PARIS, FRANCE.

PROCESS FOR REMOVING THE TAR FROM PYROLIGNEOUS LIQUIDS.

1,371,460.　　　　Specification of Letters Patent.　　Patented Mar. 15, 1921.

Application filed October 14, 1918. Serial No. 258,111.

*To all whom it may concern:*

Be it known that I, EMILE AUGUSTIN BARBET, citizen of the French Republic, residing at 5 Rue de l'Echelle, Paris, France, have invented certain new and useful Processes for Removing the Tar from Pyroligneous Liquids, of which the following is a specification.

In the carbonization of woods, pyroligneous liquids are obtained which are always highly colored by the presence of tars, whatever may be the processes used for removing the latter from the vapors when issuing from the retorts. The resultant acetates of lime and soda are roasted at a temperature sufficient for destroying the remaining tar at the risk of decomposing at the same time a small quntity of the acetate.

The process which will be described has for its purpose to remove the tar from the solutions of acetates and for result to render henceforth unnecessary the roasting operation. The said process consists in beating the pyroligneous solutions with a product, insoluble or very slightly soluble in water, which is for the tar a much better solvent than is water. It is necessary that the solvent have a greater affinity for the tar than has the water (aqueous solution).

To this condition seem to answer the benzols, naphthols, carbolic oils, carbids having a benzenic function, petroleum spirit, spirit of turpentine, pine oil, etc. Methyl acetate has good solvent properties for this purpose, but it is slightly soluble in water, so that the solution of acetate retains a portion thereof; thus necessitating a secondary distillation for recuperating this methyl acetate the cost of which is high.

Oil of acetone may also be used but necessitates a secondary distillation.

The solvent which up to now seems the best of all is cresol. Its density is slightly greater than that of water and it would seem that after agitation in contact with the solution of acetate it ought to collect at the bottom of the vessel; but the solution of acetate itself has a higher density than that of water, so that in fact it is the cresol charged with dissolved tar which floats on the surface, leaving the lower liquid perfectly decolorized.

The oily layer is drawn off and it suffices for recovering (on the one hand the tar, and on the other hand the cresol) to effect a distillation-rectification under suitable conditions.

In order to cause the solvent to react on the liquid any known splashing systems may be used, for instance the system of splashing sulfuric acid in petroleum by means of compressed air or the mechanical splashing of the same sulfuric acid in benzol for purifying it. These are then discontinous operations, by successive charges.

But it is more easy to effect a continuous purification by means of the apparatus of the type illustrated in the accompanying drawing.

In this drawing, A is the vessel containing the cresol and B the vessel containing the pyrolignite of lime or of soda. The reaction is effected in a large and very high cylinder C, filled with dividing material, such as balls of porcelain, quartz or pounded glass, coke, etc. A perforated sheet-iron plate H serves to support this dividing material which is used to give good contact between the cresol and the pyroligneous solution.

The cresol is introduced near the bottom of the cylinder C by means of the cock *a*. On the contrary, the pyrolignite enters into the cylinder C near the top of the latter, through the cock *b*. On account of having a higher density the pyrolignite goes down, while the cresol rises. The multiplicity of the contacts through the interstices of the quartz produces the same result as would splashing, but with the advantage that the action is methodical. The pure cresol at A enters into contact with a pyrolignite already nearly decolorized and removes the last traces of tar, while the pyrolignite, in the condition of maximum impurity, is able to give up some tar to the cresol which already contains some tar, whereby a strong solution of tar in cresol is formed. The amount of solvent used is thus reduced to the minimum.

At the top, at D, is a space free from quartz or coke where the tarry cresol recovers its limpidness which was disturbed by a vesicular priming of pyrolignite. Conversely, the space E at the bottom of the cylinder C serves to produce the clarification of the acetate containing cresol in emulsion.

The tarry cresol issues from the control gage tube F; the decolorized pyrolignite issues from the control gage tube G.

The impure cresol is distilled in a discontinuous alembic (a steam or naked fire alembic) or in a continuous and multiple fractionation rectifier, of the ordinary design.

However, a small quantity of acetate dissolves in the cresol and in order to avoid this loss, the tarry residue may be submitted to a lixiviation with water after recuperation of the cresol by distillation, or the tarry cresol may be submitted to a lixiviation by means of hot water before its distillation.

The tarry materials thus recuperated may give rise to products which may be used in pharmacy or in the industry.

This process for removing tar may be applied to any phase of the treatment of pyroligneous liquids before or after concentration, it may also be used in industries other than that of the carbonization of wood, such as for removing tar from raw acetones, ammonia water, and in the distillation of coal or peat, etc., and it makes it possible to obtain white products, free from tar, while doing away with the inconvenient roasting practice.

What I claim is:

1. A process of removing tarry material from pyrolignite and like solutions containing the same, which comprises intimately mixing the pyrolignite solution with a liquid having a greater solvent affinity for tarry material than has such pyrolignite solution, and separating the tar-containing liquid from the purified pyrolignite solution.

2. A process of removing tarry material from pyrolignite and like solutions containing the same, which comprises passing a current of the pyrolignite solution through a filled receptacle against a counter current of a liquid having a greater solvent affinity for tarry material than has such pyrolignite solution, and separating the tar-containing liquid from the purified pyrolignite solution.

3. A process of removing tarry material from pyrolignite and like solutions containing the same, which comprises intimately mixing the pyrolignite solution with a liquid having a greater solvent affinity for tarry material than has such pyrolignite solution, separating the tar-containing liquid from the purified pyrolignite solution, and thereafter separating the tarry material and the solvent used to dissolve the same, from each other.

4. A process of removing tarry material from pyrolignite and like solutions containing the same, which comprises intimately mixing the pyrolignite solution with a liquid having a greater solvent affinity for tarry material than has such pyrolignite solution, separating the tar-containing liquid from the purified pyrolignite solution, thereafter separating the tarry material and the solvent used to dissolve the same from each other, and washing the tarry material with water to recover pyrolignite carried therein.

5. A process of removing tar from solutions of pyrolignite and other liquids containing tar, such process consisting in intimately and systematically mixing the liquid to be treated with cresol and distilling the cresol-tar liquid for regenerating the cresol, collecting the tar, and lixiviating the same for recovering the acetate dissolved therein.

6. A process of removing tar from pyrolignite solutions and like liquids containing tar, which process comprises intimately and methodically mixing the liquid to be treated with cresol, separating the pyrolignite solution, and separately drawing off the cresol-tar liquid, thereafter lixiviating the cresol-tar liquid, to remove and recover the pyrolignite dissolved therein, and distilling off the cresol for re-use in the process.

7. In the separation of tar from pyrolignite liquor the step of subjecting the said liquor to the solvent action of cresols capable of readily dissolving the tar.

In testimony whereof I have signed my name to this specification, in the presence of two subscribing witnesses.

EMILE AUGUSTIN BARBET.

Witnesses:
   LUCIEN PAILLARD,
   TRACY LAY.